(12) United States Patent
Ivan

(10) Patent No.: US 11,248,638 B2
(45) Date of Patent: Feb. 15, 2022

(54) POLE SECTION FOR ASSEMBLY INTO A POLE FOR CLEANING ELEVATED WINDOWS AND/OR GUTTERS

(71) Applicant: Lucian Ivan, London (GB)

(72) Inventor: Lucian Ivan, London (GB)

( * ) Notice: Subject to any disclaimer, the term of this patent is extended or adjusted under 35 U.S.C. 154(b) by 878 days.

(21) Appl. No.: 15/800,108

(22) Filed: Nov. 1, 2017

(65) Prior Publication Data
US 2018/0163759 A1 Jun. 14, 2018

(30) Foreign Application Priority Data
Nov. 1, 2016 (GB) .................................... 1618430

(51) Int. Cl.
| *F16B 7/02* | (2006.01) |
|---|---|
| *B25G 1/04* | (2006.01) |
| *A47L 1/06* | (2006.01) |
| *E04D 13/076* | (2006.01) |
| *F16B 7/20* | (2006.01) |

(52) U.S. Cl.
CPC .................. *F16B 7/02* (2013.01); *A47L 1/06* (2013.01); *B25G 1/04* (2013.01); *E04D 13/0765* (2013.01); *F16B 7/20* (2013.01)

(58) Field of Classification Search
CPC ..... F16B 7/02; F16B 7/20; B25G 1/04; A47L 1/06; E04D 13/0765; Y10T 403/32475; Y10T 403/32524; Y10T 403/7079; Y10T 403/7081; Y10T 403/7083; Y10T 403/7091
USPC ......................................................... 285/321
See application file for complete search history.

(56) References Cited

U.S. PATENT DOCUMENTS

| 4,464,001 | A | * | 8/1984 | Collins | ................ | H01R 13/625 |
|---|---|---|---|---|---|---|
| | | | | | | 439/318 |
| 4,542,952 | A | * | 9/1985 | Tomsa | ................ | H01R 13/625 |
| | | | | | | 439/318 |
| 4,856,929 | A | * | 8/1989 | Smahlik | .................... | A47L 1/06 |
| | | | | | | 403/297 |
| 5,628,336 | A | * | 5/1997 | Lee | ........................ | E04H 15/42 |
| | | | | | | 135/114 |
| 5,694,695 | A | * | 12/1997 | Lund | ...................... | B25G 1/04 |
| | | | | | | 15/144.4 |

(Continued)

FOREIGN PATENT DOCUMENTS

| FR | 1372566 A | * | 9/1964 | ............ F16L 37/113 |
|---|---|---|---|---|
| GB | 2547623 A | | 8/2017 | |

*Primary Examiner* — Matthew R McMahon
(74) *Attorney, Agent, or Firm* — The Harris Firm

(57) ABSTRACT

A pole section for temporary assembly with similar pole sections into an elongate pole assembly whereby a user can perform work on a remote worksite elevated by up to 20 m above the user. Each pole section includes a male end and a female end, having a complementary taper to slide into or around the other of a male or female end and form a fluid tight joint with a stiffness similar to or greater than the overall stiffness of the pole. The ends of each pole section include one of first and second complementary coupling parts. The coupling parts cooperate to prevent the pole sections moving relatively towards each other under the weight of overlying pole sections in use to prevent the pole sections jamming A resiliently deformable locking structure is provided in a coupling part by a ring spring.

24 Claims, 5 Drawing Sheets

(56) References Cited

U.S. PATENT DOCUMENTS

| | | | | |
|---|---|---|---|---|
| 5,741,084 A * | 4/1998 | Del Rio | ............ | A61B 17/1633 |
| | | | | 285/361 |
| 6,481,763 B2 * | 11/2002 | Mintz | ....................... | E03C 1/20 |
| | | | | 285/129.1 |
| 6,997,633 B2 * | 2/2006 | Thomas | ................. | A01D 34/90 |
| | | | | 172/438 |
| 7,066,511 B2 * | 6/2006 | Newman | ................. | F16B 7/149 |
| | | | | 294/210 |
| 7,533,688 B2 * | 5/2009 | Schuster | ................... | E03D 1/32 |
| | | | | 137/426 |
| 7,980,781 B2 * | 7/2011 | Trice | ........................ | B25G 1/04 |
| | | | | 403/349 |
| 8,434,802 B2 * | 5/2013 | Lofley, Sr. | ............... | B25G 1/04 |
| | | | | 294/210 |
| 8,579,537 B2 * | 11/2013 | VanLandingham | ...... | B25G 3/18 |
| | | | | 403/341 |
| 8,641,314 B2 * | 2/2014 | Thacker | .................... | F16B 7/00 |
| | | | | 403/322.2 |
| 9,303,409 B2 * | 4/2016 | Lopez | ................... | E04D 15/006 |
| 2015/0020827 A1 * | 1/2015 | Liu | ....................... | A24F 47/008 |
| | | | | 131/329 |
| 2016/0186792 A1 * | 6/2016 | Valencia | ................... | F16B 7/20 |
| | | | | 403/349 |
| 2018/0092401 A1 * | 4/2018 | Cai | ...................... | A24F 47/008 |

\* cited by examiner

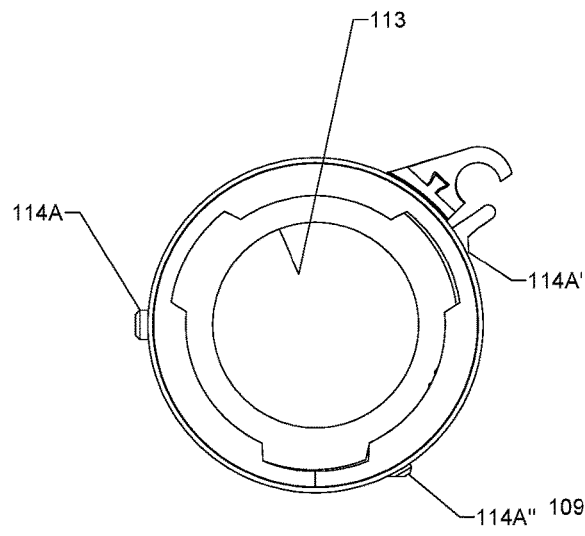
Fig 2C
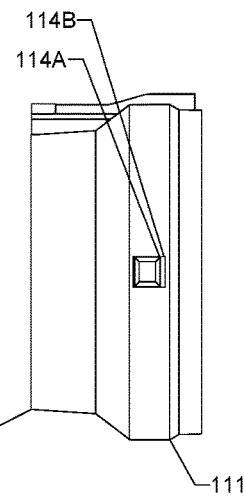
Fig 2D
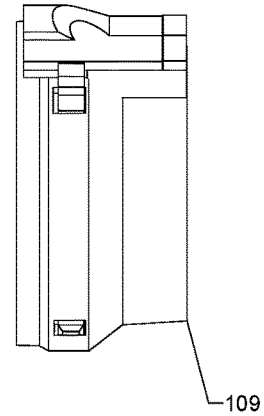
Fig 2E
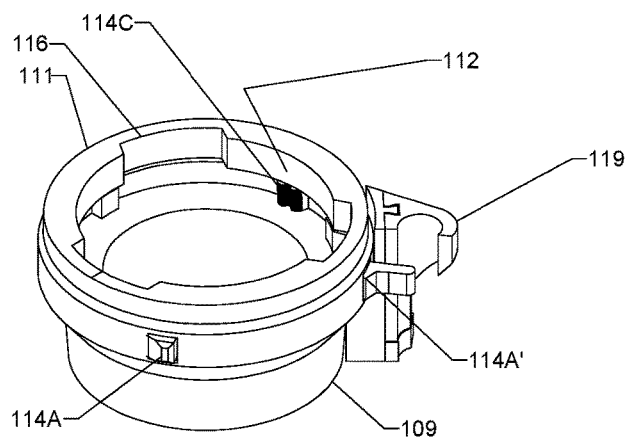
Fig 2F
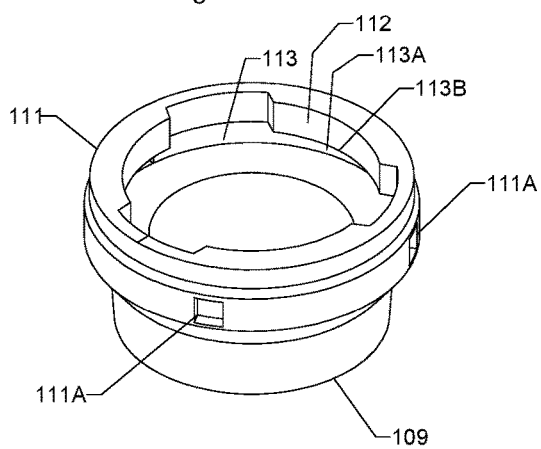
Fig 2G
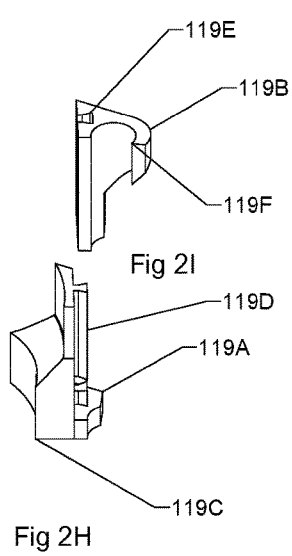
Fig 2I
Fig 2H

POLE SECTION FOR ASSEMBLY INTO A POLE FOR CLEANING ELEVATED WINDOWS AND/OR GUTTERS

CROSS REFERENCE TO PRIOR APPLICATION(S)

This application is a non-provisional application that claims priority to United Kingdom patent application serial number GB1618430.1 (filed on Nov. 1, 2016) under 35 U.S.C. § 119a, which is hereby incorporated by reference herein in its entirety.

TECHNICAL FIELD

The present invention is a pole section to be assembled into a pole for use on a worksite remote from the user. Such poles are commonly used for cleaning windows or gutters at a location remote from the user, especially windows and gutters elevated relative to the user. In particular these systems are comprised of multiple elongate pole sections assembled to form the pole, and supporting a cleaning device such as; a brush, sponge, squeegee, spray or suction nozzle.

PRIOR ART

A well-known method for cleaning relatively elevated windows and gutters is via the use of an elongated pole assembly held by hand at one end and having a tool such as one or more of a brush, sponge, spray or suction nozzle secured at the remote elevated end. In order to be able to reach a target such as a window or gutter up to seven or eight stories (approximately 20 m) above the user, the pole assembly is assembled from pole sections. To minimise the mass of the pole assembly the pole sections are commonly cylindrical tubes fabricated from a material such carbon composite, to achieve the required stiffness while continuing to be light and therefore minimise swaying and maximise control.

Some pole assemblies are constructed of telescopic pole sections. In such a case each section is of a uniform outside and inside diameter, however each other subsequent section must be of relatively reduced diameter so that one extensible pole section can slide substantially entirely into another pole section. It should be understood that the extensible section may be a housing section for a further extensible section. It is necessary to incorporate fluid seals and bearing structures between each housing section and associated extensible section, thereby increasing the weight and complexity of fabrication.

To prevent the weight of the extended telescopic pole sections causing the pole section to telescope back into the respective housing sections, it is necessary to provide a clamp or brake, commonly in the form of an overlocking cam mechanism manually actuated by a lever. This is also necessary to prevent relative rotation of the pole sections. The lever can snag on protruding features of a structure being worked on, which at best is annoying and at worst case can cause the clamp to fail and the extended pole to retract into or pull out of the associated housing section. Elements such as screws, rivets or pins are commonly used to secure the clamp parts to each pole section by piercing the tubular wall of the pole section. The securing elements therefore obstruct the bore of the pole and produce weakened stress concentration points.

A further disadvantage of the telescopic system is that the repeated extending and retraction of the pole sections causes wear on the bearing structures and seals. Furthermore the bearing structures and seals are usually resilient elastomer rings which introduce play between the sections. Play will make it harder work to bring the remote end of the pole on target.

Commonly the clamp bites onto the carbon fibre, wearing into the carbon fibre. Frequent repeated application of the clamp will cause the pole section in the region of the clamp application to fail. When extending the pole sections, one pole section, usually the innermost or top section is extended most frequently and will fail first as a result. This usually results in the whole telescopic pole assembly being discarded and replaced.

Telescopic poles are difficult to disassemble and are therefore practically of a fixed weight.

An alternative modular form of the apparatus is illustrated in the sectional view of FIG. 1 (prior art). This uses multiple similar elongate tubular pole sections 1*a*, 1*b*, tapered so that the narrow, male end 2*a*, of a first pole section 1*a* sockets into the wide female end 2*b* of the extending pole section 1*b*. For the avoidance of doubt, many more than two pole sections can be assembled but two is sufficient to illustrate the principle. FIG. 1 shows the taper somewhat exaggerated since the pole sections are each around 1.8 m to 2 m long and drawn to scale the taper is not clearly visible. The outer surface of the narrow male end part engages with a close sliding fit in the complementarily tapered inner surface of the engaged wide female end forming an effective fluid tight seal without the use of elastomer or other fluid sealing elements. For the purposes of this specification a middle part is defined as that part of the pole section which does not overlap with the male and female parts of two other pole sections (above and below) joined to the pole section. The intimately engaged surfaces of the male and female ends of the pole cooperate to increase the stiffness of the assembled pole relative to the separate pole sections.

One application of an apparatus of this type is in suction cleaning, for example in gutters. In this case an arcuate suction nozzle is attached to the tip of the pole to reach down into the gutter. Suction is then applied at the base of the pole and communicated to the suction nozzle via the bore in the hollow pole. Fouling in the gutter can then be drawn into the suction nozzle and evacuated through the pole assembly.

A problem with telescopic section rods is that the bore is unavoidably narrow at the top of the deployed pole which therefore tends to foul and choke. In this event much time can be wasted in bringing the tip down to unblock the bore and redeploy the apparatus.

The bore of an assembled modular pole is, of similar diameter at the tip of the pole as it is at the base of the pole. There are no obstructions in the pole bore making choking and blockage unlikely.

The user of a modular taper pole section pole assembly only deploys the number of pole sections required to reach the elevation of the work target. A telescopic pole assembly cannot easily be separated from the pole assembly, and consequently, the mass of a telescopic pole is essentially fixed. Thus for at least some duties, a taper pole can be made lighter and therefore relatively more stiff and easier to use than a telescopic pole.

Taper section rods suffer a significant disadvantage over telescopic rods in that the weight of overhead sections causes a wedging action between connected sections. Even if the user has troubled to deploy lubricant on the joining surfaces any fouling can cause the joints to jam together so that they are very difficult to separate after deployment. A further problem is caused if the user wishes to deploy the pole from above, downwards or sideways. In this condition the weight of depending sections may pull the joints apart.

The present invention aims to provide a connector for a taper section pole which allows taper section rods to be reliably and easily connected into a pole assembly and prevents either the jamming or pulling apart described above. The connector aims to avoid any obstruction to the bore of the pole or weakening of the section. The connector will aim to be resistant to snagging.

STATEMENT OF INVENTION

A pole section for temporary assembly with similar pole sections into an elongate pole assembly apparatus to extend the manual reach of a user whereby a user can perform work on a worksite remote from the user where the site is elevated by up to 20 m above the user comprising:

an elongate tubular pole section having a male end part and a female end part configured so that the male end part of a first pole section can fit a predetermined distance into a female end part of a second pole section to form a fluid tight sliding fit without obstructing the bore of the pole sections;

each pole section having a first coupling part provided adjacent a female end of the pole section and a co operable second coupling part provided at a predetermined distance from the male end of the pole section whereby the first coupling part of a first pole section will disengageably engage with the second coupling part of a second pole section when the respective male end is received into the female end socket in order to prevent unwanted relative longitudinal movement of the first and second pole sections;

wherein the outside surface of the male end is tapered and the internal surface of the female end of the pole section is tapered to provide a corresponding surface and each coupling part is provided by a collar secured to the external surfaces of the respective male end and female end of the pole section such that only a predetermined length of the pole section can be inserted into another pole section to prevent the pole sections jamming together;

the first coupling part being engageable with the second coupling part by means of at least one pin projecting radially from one coupling part to engage in a track formed in the other coupling part, the track configured to require the coupling parts to go through a sequence of axial and circumferential movements to be secured or separated, and a resiliently deformable locking structure incorporated into the coupling parts to discourage unintentional movement and therefore to resist uncoupling, the locking structure being located in one of the coupling parts so that the weight of the other of the coupling parts is not applied to the locking structure in use.

The taper of the male end part and the female end part is preferably provided by forming the pole section to have a uniform wall thickness and a uniform taper extending from a relatively large diameter female end to a small diameter male end. However, the invention does encompass pole sections with a middle part of uniform wall thickness and diameter, the wall thickness being progressively varied at the male end part and female end part. The middle part is defined as that part of the pole section which does not overlap with the male and female parts of two other pole sections joined to the pole section.

Each male and female coupling part may be in the form of a collar secured to the external surfaces of the pole section. Advantageously each coupling part can be secured to the external surface of the pole section without perforating or otherwise removing material from the pole section. The coupling parts are preferably secured in a manner which avoids introducing any substantial obstruction to the bore of the pole section. At least one radially extending projection is provided. The projection may extend out from the male coupling part or radially in from the female coupling part. The projection is arranged to be received into a track formed in the other of the female or male coupling parts. The track extends longitudinally and circumferentially. Thus the coupling parts are engageable by relative longitudinal and rotational displacement. Preferably two or more projections are provided on one of the coupling parts, with a corresponding number of tracks formed in the other of the coupling parts.

In all variants the location of the male and female coupling is such that the male and female tapered surfaces of different pole sections may form a sliding fit, preferably a close sliding fit when the corresponding male and female coupling parts are engaged. This ensures; a fluid tight join between the pole sections, and the resulting intimate contact between the conical surfaces provides maximum stiffness at the joint with minimal play. The stiffness of the assembled joint of a pole assembly will preferably be equal to or greater than the stiffness of a pole section. This also ensures that most of the stress in the pole when it is extended is carried by the pole sections and not the connector so that the connector can be lightweight, compact and formed of inexpensive materials.

Preferably the coupling parts are secured to the pole sections by means which does not involve removal of any material from the pole sections. Such means includes adhesive bonding. However, mechanical fastening means such as pins, screws, rivets and location fits (eg force fit or shrink fit) are contemplated.

An important feature of the coupling part is that it resists longitudinal movement of the coupled pole sections towards each other beyond the point at which the male and female surfaces form fluid tight intimate sliding fit. This prevents the weight of many assembled pole sections from causing the joint to jam and become very difficult to separate.

The invention may encompass a first coupling part and a second coupling part adapted to be mounted on a pole section to provide a pole section.

The invention may also encompass a tool, having either one of the first or second coupling parts to facilitate connection of the tool to an end of a pole section. A tool may be at least any of:

a. a discharge nozzle to discharge fluids including gases, vapours, smoke or liquids, particularly water, cleaning fluids, paint or other coating materials;

b. a suction nozzle to suck material from gutters or other locations;

c. brushes for cleaning or to apply coating materials such as paint or for cleaning surfaces.

d. a camera for site inspection and recordal

Figure 1:
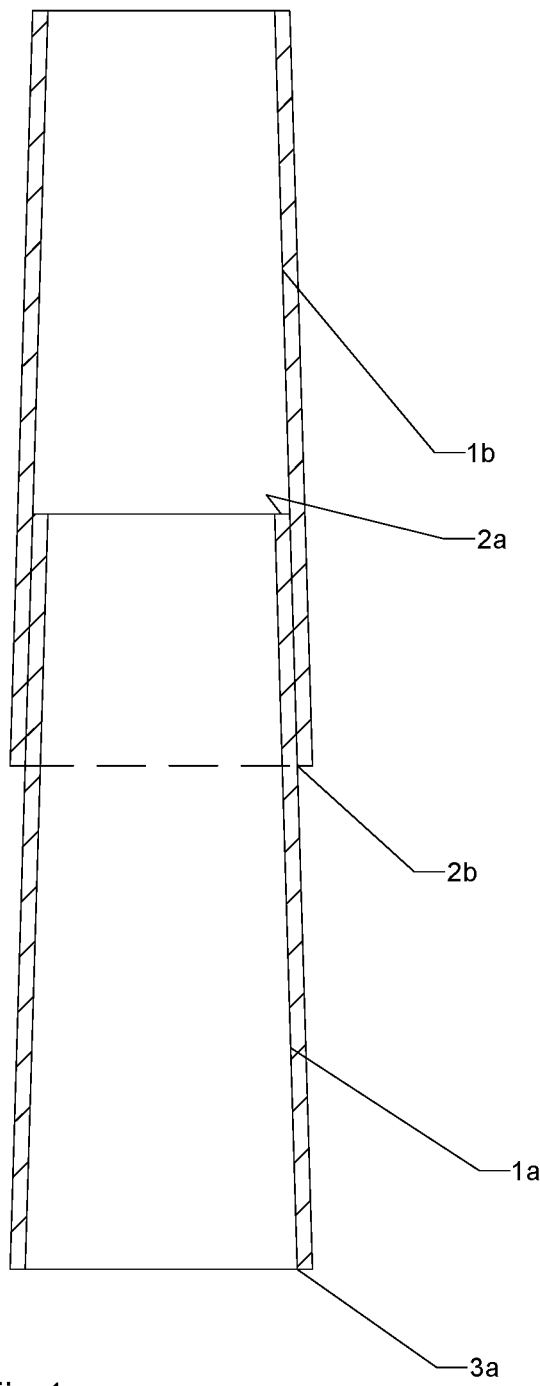
FIG. 1 illustrates a prior art apparatus.
Figure 2A:
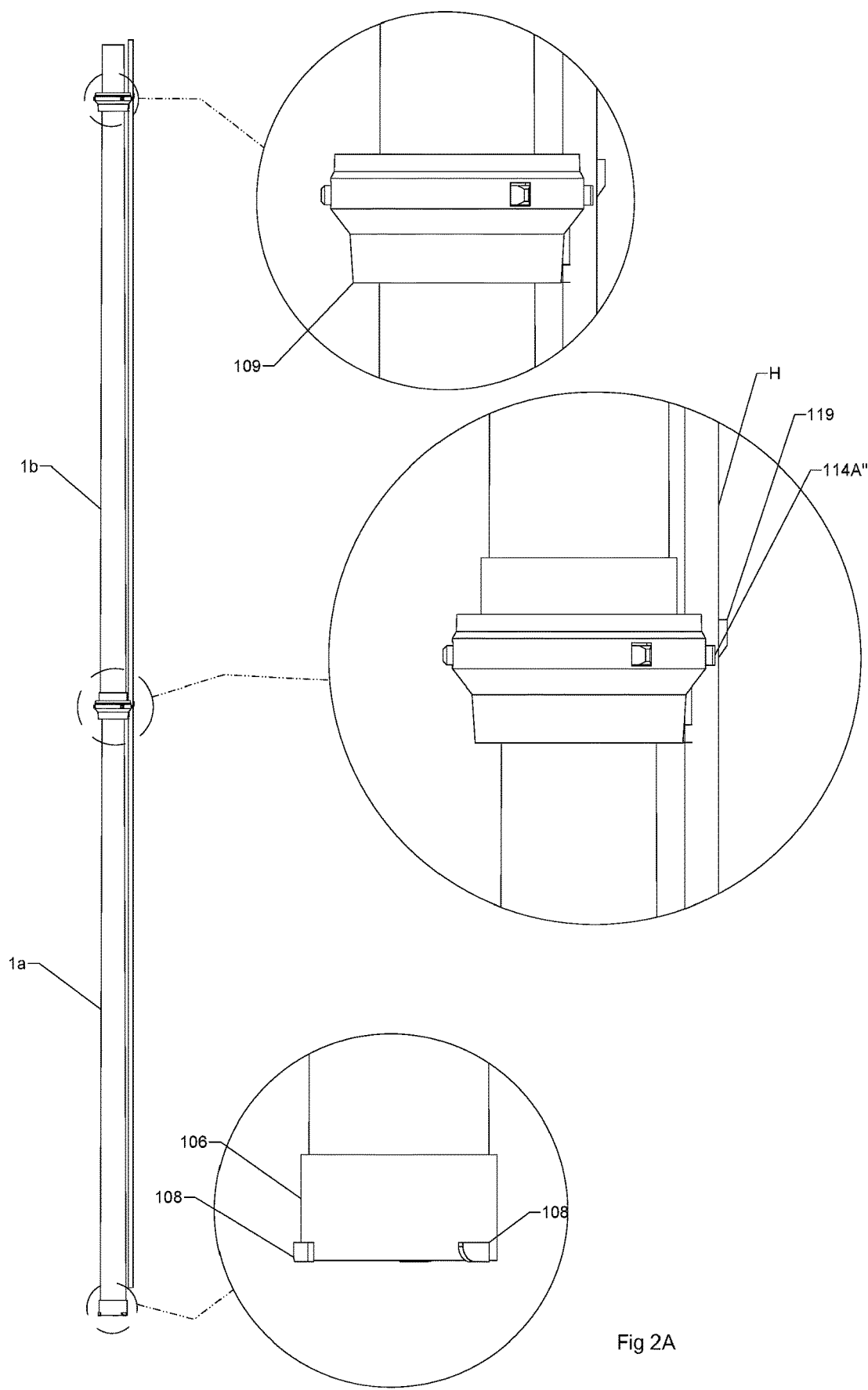
Figure 2B:
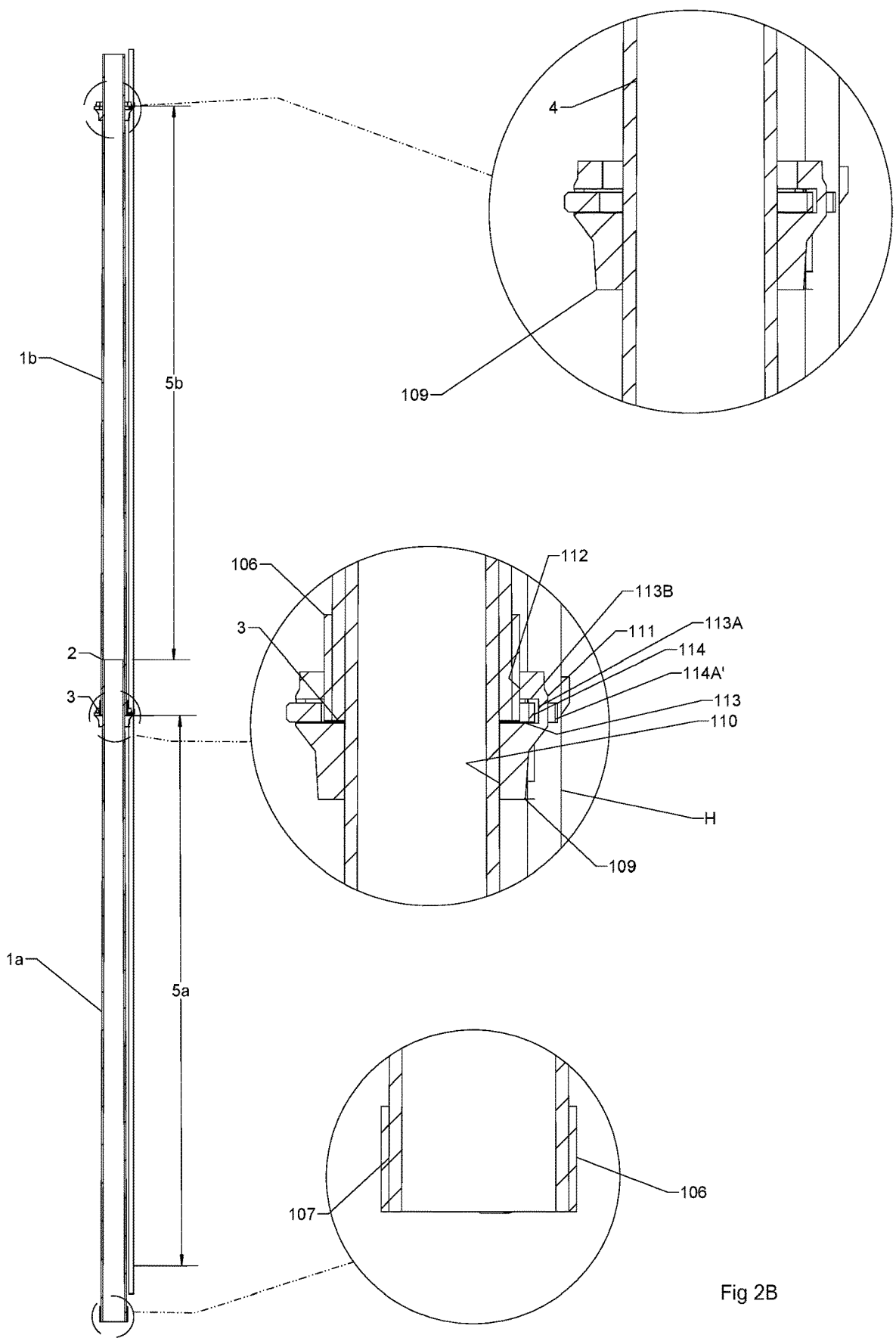
Figure 2J:
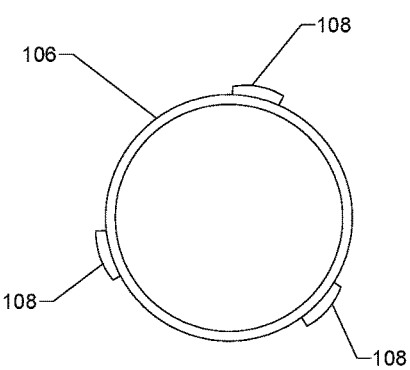
Figure 2K:
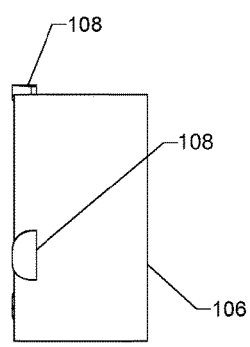
Figure 2L:
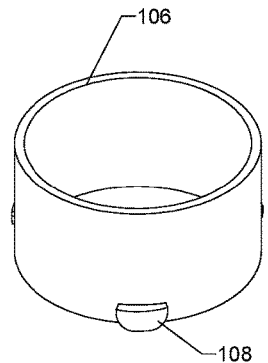
Figure 2M:
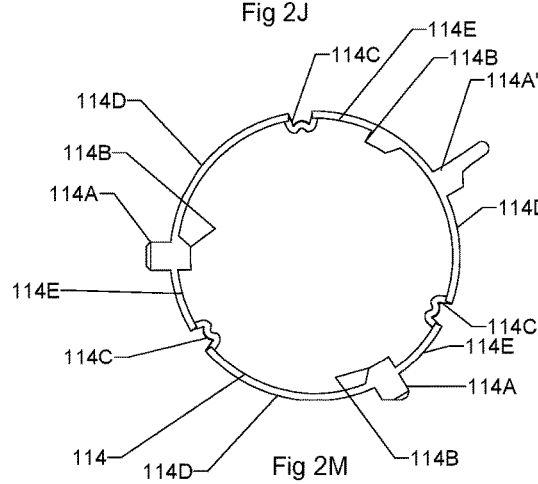
Figure 2N:
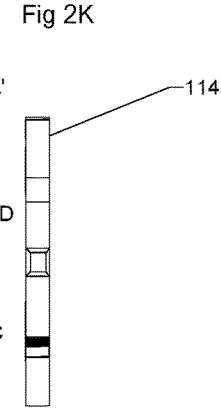
Figure 2O:
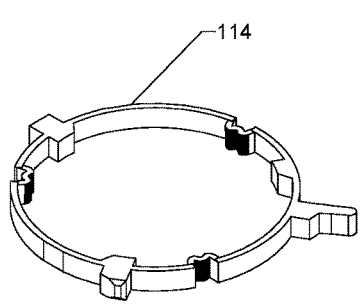
Figure 2P:
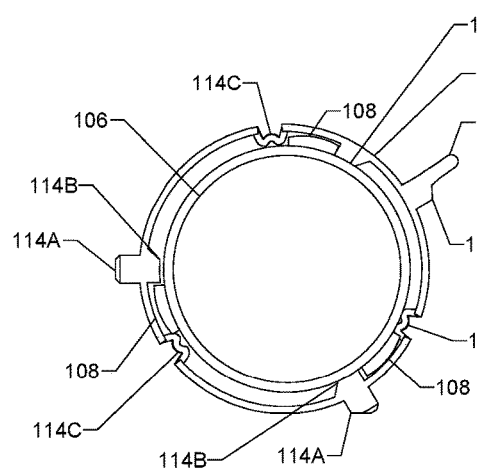
Figure 2Q:
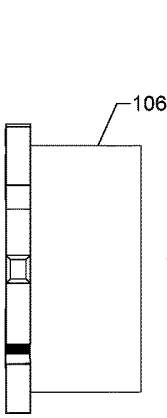
Figure 2R:
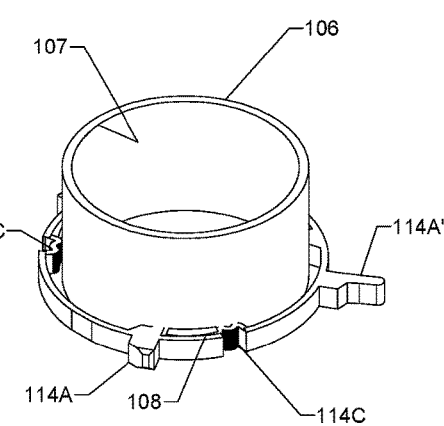

An embodiment of an apparatus constructed in accordance with the present invention, will now be described, by way of example only, with reference to the accompanying illustrative figures, in which:

FIG. 2A is a front elevation of an embodiment of the pole section of FIG. 2A;

FIG. 2B is a sectional front elevation of the apparatus of FIG. 2A;

FIG. 2C is a plan view of a second coupling part and a spring of the embodiment;

FIG. 2D is a left elevation of the second coupling part and a spring of the embodiment;

FIG. 2E is a right elevation of the second coupling part and a spring of the embodiment;

FIG. 2F is a SE isometric view of the second coupling part and the spring of the second embodiment;

FIG. 2G is a SE isometric view of the second coupling part with the spring removed;

FIG. 2H is a SE isometric view of a hose clip mount of the embodiment;

FIG. 2I is a SE isometric view of a hose clip of the embodiment;

FIG. 2J is a plan view of a first coupling part of the embodiment;

FIG. 2K is a front elevation of the first coupling part of the embodiment;

FIG. 2L is a SE isometric of the first coupling part of the embodiment;

FIG. 2M is a plan elevation of the spring of the embodiment;

FIG. 2N is a front elevation of the spring of the embodiment;

FIG. 2O is a SE isometric vie of the spring of the embodiment;

FIG. 2P is a plan of the spring in combination with the first coupling part of the embodiment;

FIG. 2Q is a front elevation of the of the spring in combination with the first coupling part of the embodiment; and FIG. 2R is a SE isometric view of the spring in combination with the first coupling part of the embodiment.

DETAILED DESCRIPTION

FIG. 2A shows a plan view of the apparatus showing two pole sections 1a and 1b temporarily joined together for use as a pole assembly. Each pole section 1a, 1b is tubular and has an unobstructed bore 4 extending from a female end 3 to a male end 2. The wall of the pole section tapers from a large diameter at the female end down to a narrow diameter at the male end so that male end 2a of one pole section slides into the female end 3a of another pole section for a predetermined distance before the outer wall of the male end part contacts the inner wall of the female end part as shown in the detail of FIG. 2B. The wall of the pole in this example is approximately 5 mm thick and has an inside diameter of 60 mm. Each pole section is 1800 mm long and the taper is uniform so that the outside diameter at the female end is 70 mm and the outside diameter at the male end is 58 mm as a result approximately 150 mm of the male end will slide into a corresponding length of female end (a variant of the pole section might taper from 52 mm OD to 47 mm OD). The pole section will be made of a material which facilitates a light stiff structure such as carbon fibre composite. In use up to ten or more similar pole sections may be joined together to reach windows or gutters elevated seven or more stories up from the user. In order to clearly distinguish the stiffness of the pole sections from sectional hose such as is used to clean a swimming pool, it should be understood that the pole sections, and more particularly the apparatus formed by assembling the pole sections is made as stiff as possible without adding to the weight of the apparatus beyond what can be handled manually. An assembled apparatus will be sufficiently stiff to have a tip deflection of less than 10% of its length when the tip is raised substantially vertically above the operator, in other words, if the assembled pole is 10 m long and held vertically from the bottom most section, then the tip of the top pole section will deflect from the axis of the bottommost section by 1 m or less.

The portion of the pole section (1a and 1b) which cannot sleeve in or over a respective female part 3 or male part 2 is referred to as the middle part 5 (5a and 5b) and a transition position is defined between the middle part and the male and female end parts.

A male coupling part is provided by a ring 106 having a bore provided by an internal frusto conical face 107. The face 107 has a maximum and minimum diameter corresponding to the diameters of the pole section at the transition between a male end part 2 and a middle part 5. The face 107 may be treated to facilitate adhesive bonding between the ring and the external surface of the pole section at the transition position as shown in FIGS. 2A and 2B. The male coupling part is secured to the pole section by aligning it with the wider end of the bore towards the female end 3 of the pole section 1a, 1b and sliding the ring onto the pole section until the face 107 bears onto the female end part adjacent the wide end of the pole section. Adhesive may be applied to the face 107 to bond the ring 106 into place. Alternatively the ring 106 may be expanded by warming above the temperature of the pole section and allowed to shrink into place. In this case the diameters of the ring face will be chosen to slide to the correct position when warmed. The ring 106 supports three pins 108 extending radially out from the ring 106. The pins 108 are equiangularly spaced around the circumference of the ring at its base end.

A female coupling part comprises a ring 109 having an axially facing frusto conical face 110 around a bore. The ring 109 extends radially away from the axis to support a longitudinally extending sleeve 111 having an internal bore 112 with a radius sufficient to receive the outer surface of the male coupling part with a sliding fit. The ring 109 provides a radial shoulder 113 to provide an abutment for an annular resilient structure accommodated in the bore 112 of the ring 109. In this embodiment the resilient structure is provided by a ring spring 114. The ring spring 114 locates into an annular groove 113A extending radially into the sleeve 111 to form an overhanging retaining shoulder 113B.

The ring spring 114 is a generally circular structure formed in this example from a durable resilient material which in this example is a plastics material specifically a nylon. The rings spring is fabricated to include at least one, and in this case three outer projections 114A extending radially away from the centre and spaced around the circumference. In this example the projections are equiangularly spaced. The outer projections 114A are generally cuboid and their outer edges may be chamfered to facilitate their location into apertures 111A, formed through the sleeve 111 adjacent the groove. The projections 114A and apertures cooperate to serve as a counter rotation brake to prevent rotation of the ring spring in the groove 113A. Other, alternative counter rotation structures may be employed including projections extending axially into recesses formed in the shoulders 113.

The ring spring 114 also includes several inner projections 114B extending radially in towards the axis. In the example there are three inner projections 114B each having a bearing surface to engage the outer surface of the male coupling part 106. The inner projections 114B may be coextensive with the outer projections 114A to improve their stability. The projections thus form structures which are rigid relative to other parts of the ring spring and so maintain the relative positioning of the components. The ring spring 114 also includes resiliently deformable features 114C. The resiliently deformable features 114C extend radially in from the ring spring. The number of resilient features corresponds to the number of inner projections. Each is formed to be capable of repeatedly deforming radially outwardly when subject to a force applied in the circumferential direction. In the example the resilient feature has a generally "W" shaped cross section. Each of the outer projections 114A, inner projections 114B and resilient features 114C is connected by alternating long arcuate elements 114D and short arcuate elements 114E so that each resilient feature is angularly separated from the closest inner projection by a short arcuate element 114E.

When the ring spring 114 is installed in the groove 113A a gap remains between the arcuate elements 114D, 114E and the axially extending wall of the groove 113A.

Grooves 116 extend axially from an end face of the female coupling part to open into the annular groove 113A. The number of axial grooves 116 corresponds to the number of long axial elements of the ring spring, in this case three, and each axial groove 116 extends to join the annular groove 113A in a region coextensive with the long arcuate element 114D of the ring spring when the ring spring is located in the groove 113A. The axial grooves 116 are thus arranged to receive the pins 108 of the male coupling part 106. Rotation of the male coupling part (and in practice the associated pole section) towards the resilient features 114C (clockwise) causes the pins to deform the resilient deformable features 114C so that each pin 108 rotates until it engages one inner projection 114B. The further clockwise rotation of the pin 108 and male coupling part relative to the female coupling part is prevented by the inner projections. Counter clockwise rotation is resisted by the resiliently deformable features 114C. However, an application of sufficient torque to the male coupling part in the counter clockwise direction will overcome the resistance of the resiliently deformable features to allow the pins to rotate into alignment with the axial grooves 116 for separation of the male and female coupling parts.

Although the spring of the embodiment is fabricated from nylon plastics, alternative materials are possible including spring steels, particularly corrosion resisting spring steels or fibre reinforced plastics, ideally light weight carbon fibre reinforced plastics to fulfil the design requirements of long service life, low weight and corrosion resistance.

The embodiment also discloses a separable, replaceable, hose clip structure 119 comprising a hose clip mounting member 119A and a hose clip 119B. The mounting member 119A has a base part 119C providing a surface conforming to the outside of the female coupling part. A dovetail structure 119D is formed on the radially outer surface of the mounting member 119A to extend axially when the mounting is attached to the female coupling part adjacent the projection 114A'. The hose clip 119B has a dovetail groove 119E arranged to engage the dovetail 119D in order to secure the hose clip to the female coupling part, and a hook 119F to receive the hose "H". Some users may prefer to secure the hose by coiling the hose around the pole sections. In this case the hose clip would not be useful and may actually be a nuisance and can readily be removed without affecting the performance of the coupling. Where the hose clip is used the projection 114A' is extended radially outward to provide a sprung thumb 114A" disposed to retain a hose 'H' in a hook of the clip.

The embodiment provides a coupling where the spring has low vulnerability to wear.

Although this apparatus is particularly adapted for use in cleaning elevated windows or gutters and has been described with that application in mind the apparatus may be useful in other applications requiring access to positions relatively elevated or remote from the operator, for example painting or inspection. For example the apparatus may support tools to apply paint or similar wet materials such as a brush, sponge, roller or spray gun. In the case of inspection the apparatus may support a camera. The pole may also provide a temporary support structure (mast) for an antenna or security camera.

The invention claimed is:

1. A pole section for temporary assembly with similar pole sections into an elongate pole assembly apparatus to extend the manual reach of the user whereby the user can perform work on a worksite remote from the user where the site is elevated by up to 20 m above the user comprising:
   an elongate tubular pole section having a male end part and a female end part configured so that the male end part of a first pole section can fit a predetermined distance into a female end part of a second pole section to form a fluid tight sliding fit without obstructing the bore of the pole sections;
   each pole section having a first coupling part provided adjacent the female end part of the pole section and a co-operable second coupling part provided at a predetermined distance from the male end part of the pole section whereby the first coupling part of the first pole section will disengageably engage with the second coupling part of the second pole section when the respective male end part is received into the female end part in order to prevent unwanted relative longitudinal movement of the first and second pole sections;
   wherein an outside surface of the male end part is tapered and an internal surface of the female end part of the pole section is tapered to provide a corresponding surface and each coupling part is provided by a collar secured to the external surfaces of the respective male end part and female end part of the pole section such that only a predetermined length of the pole section can be inserted into another pole section to prevent the pole sections jamming together,
the first coupling part being engageable with the second coupling part by means of at least one pin projecting radially from one coupling part to engage in a track formed in the other coupling part, the track configured to require the coupling parts to go through a sequence of axial and circumferential movements to be secured or separated, and a resiliently deformable locking structure incorporated into the coupling parts to discourage unintentional movement and therefore to resist uncoupling, the locking structure being located in one of the coupling parts so that the weight of the other of the coupling parts is not applied to the locking structure in use.

2. A pole section according to claim 1 wherein each coupling part is secured to the external surface of the pole section without perforating the pole section.

3. A pole section according to claim 1 wherein the predetermined length is sufficient to provide a joint of the same or greater bending stiffness to the bending stiffness of the pole section.

4. A pole section according to claim 3 wherein the predetermined length is not less than 5% of the length of the elongate tubular pole section.

5. A pole section according to claim 4 wherein the predetermined length is not less than 8% of the length of the elongate tubular pole section.

6. A pole section according to claim 1 wherein each of the internal and external surfaces of the pole section taper uniformly from the female end part to the male end part.

7. A pole section according to claim 1 wherein the locking structure is arranged to resist unintentional rotary movement.

8. A pole section according to claim 7 wherein the locking structure is a ring spring.

9. A pole section according to claim 8 wherein the ring spring is received into an annular groove.

10. A pole section according to claim 9 wherein the ring spring is formed with at least one projection to engage in a recess formed in the coupling part to prevent relative rotation of the ring spring and coupling part.

11. A pole section according to claim 10 wherein the ring spring includes an inner projection arranged to engage a pin of the other coupling part and prevent further relative rotation in one direction.

12. A pole section according to claim 11 wherein; the ring spring includes a resiliently deformable feature projecting to engage a pin of the other coupling part, said resiliently deformable projection adapted to deform when sufficient torque is applied to the other coupling part and, allow rotational passage of the pin to engage the inner projection, said resiliently deformable feature being circumferentially spaced from the inner projection, to trap the pin, without deformation of the resiliently deformable feature when the pin engages the inner projection.

13. A pole member according to claim 9 wherein, the annular groove is formed into a female coupling part.

14. A pole section according to claim 1 wherein one of the coupling parts provides a hose clip structure.

15. A pole section according to each of claim 14 wherein the inner projection which prevents relative rotation of the female end part and the ring spring extends through the female end part to cooperate with the hose clip structure to form a resiliently deformable thumb which presses a hose into a hook of the hose clip structure.

16. A pole section according to claim 14 wherein the hose clip structure is replaceably removable from the coupling part.

17. A pole section according to claim 14 wherein the inner projection which prevents relative rotation of the female coupling part and the ring spring extends through the female coupling part to cooperate with the hose clip structure to form a resiliently deformable thumb which presses a hose into a hook of the hose clip structure.

18. A pole section according to claim 1 wherein each collar is provided by a ring having a frusto-conical internal surface complementary and corresponding with the radii of the external surface of the pole section at the position the coupling part is required to be located.

19. A pole section according to claim 1 wherein each of the first and second coupling parts are secured to the pole section without removing material from the pole section.

20. A pole section according to claim 1 wherein each of the first and second coupling parts are secured to the pole section without obstructing the bore of the pole section.

21. A pole section according to claim 1 wherein each coupling part is secured to the external surface of the pole section by adhesive.

22. A plurality of pole sections according to claim 1 coupled together to provide an apparatus for accessing a worksite remote from a user.

23. A first coupling part and a second coupling part adapted to be mounted on a pole section to provide a pole section according to claim 1.

24. A tool in combination with a pole section according to claim 1
wherein the tool can be attached to the male end part or the female end part of the pole section.

* * * * *